United States Patent
Thomas et al.

(10) Patent No.: US 7,207,066 B2
(45) Date of Patent: Apr. 17, 2007

(54) METHOD FOR PROTECTING A MICROCOMPUTER SYSTEM AGAINST MANIPULATION OF DATA STORED IN A STORAGE ARRANGEMENT OF THE MICROCOMPUTER SYSTEM

(75) Inventors: Martin Thomas, Kraichtal (DE); Klaus Schneider, Ludwigsburg (DE); Axel Aue, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 644 days.

(21) Appl. No.: 09/766,102

(22) Filed: Jan. 19, 2001

(65) Prior Publication Data

US 2001/0025347 A1 Sep. 27, 2001

(30) Foreign Application Priority Data

Jan. 19, 2000 (DE) ................................ 100 02 203

(51) Int. Cl.
G06F 12/14 (2006.01)
H04L 9/32 (2006.01)

(52) U.S. Cl. ............................ 726/26; 726/22; 726/27; 726/30; 713/187; 713/193

(58) Field of Classification Search ......... 713/193–201
See application file for complete search history.

(56) References Cited

U.S. PATENT DOCUMENTS 5,643,086 A * 7/1997 Alcorn et al. .................. 463/29
5,745,678 A * 4/1998 Herzberg et al. ............ 713/200
5,835,594 A * 11/1998 Albrecht et al. ............. 713/187
5,944,821 A * 8/1999 Angelo ........................ 713/200
5,953,502 A * 9/1999 Helbig, Sr. .................. 713/200

(Continued)

FOREIGN PATENT DOCUMENTS

DE 197 23 332 9/1998

OTHER PUBLICATIONS

Adelstein, F., et al, 'Detection of Malicious Boot Firmware', Annual Computer Security Applications Conference, Dec. 9, 2002, entire document, http://www.acsac.org/2002/papers/72.pdf.*

(Continued)

Primary Examiner—Nasser Moazzami
Assistant Examiner—Ronald Baum
(74) Attorney, Agent, or Firm—Kenyon & Kenyon LLP

(57) ABSTRACT

A method for protecting a microcomputer system against manipulation of data stored in a storage arrangement of the microcomputer system, in particular for protecting a program stored in the storage arrangement. The microcomputer system includes a microcomputer assigned to the storage arrangement, the microcomputer accessing the storage arrangement for the purpose of processing the data, i.e., the program. In order to prevent the manipulation of data in a microcomputer that does not have an internal memory but rather accesses an external storage arrangement and processes the stored data, it is proposed that before the storage arrangement is accessed, an individual identifier be assigned to the or to each allocated microcomputer or to the storage arrangement that a comparison code be generated as a function of the individual identifier and be stored in the storage arrangement, and that, before or during the operation of the microcomputer system, a security code be generated as a function of the individual identifier and be compared with the comparison code.

16 Claims, 2 Drawing Sheets

U.S. PATENT DOCUMENTS 6,009,524 A * 12/1999 Olarig et al. ............... 713/200
6,138,236 A * 10/2000 Mirov et al. ................ 713/200
6,272,629 B1 * 8/2001 Stewart .......................... 713/2
6,401,208 B2 * 6/2002 Davis et al. ................ 713/193
6,571,335 B1 * 5/2003 O'Donnell et al. ......... 713/173
6,823,451 B1 * 11/2004 Gulick et al. ............... 713/153

OTHER PUBLICATIONS

Walters, T., 'Enabling DRM in Embedded Devices', linuxdevices. com, Aug. 17, 2005, entire document, http://linuxdevices.com/articles/AT3715099716.html.*

* cited by examiner

METHOD FOR PROTECTING A MICROCOMPUTER SYSTEM AGAINST MANIPULATION OF DATA STORED IN A STORAGE ARRANGEMENT OF THE MICROCOMPUTER SYSTEM

FIELD OF THE INVENTION

The present invention relates to a method for protecting a microcomputer system against the manipulation of data stored in a storage arrangement of the microcomputer system. In particular, the present invention relates to a method for protecting a program stored in the storage arrangement. The microcomputer system has a microcomputer that is assigned to the storage arrangement, the microcomputer accessing the storage arrangement for processing the data, i.e., the program. The present invention also relates to a storage arrangement in which data, in particular a program, are stored and to which at least one microcomputer is assigned which accesses the storage arrangement for the purpose of processing the data, i.e., the program. Finally, the present invention relates to a microcomputer system having at least one microcomputer and one storage arrangement assigned to that microcomputer or to each microcomputer, data, in particular, a program, being stored in the storage arrangement, the or each microcomputer having access to the storage arrangement for the purpose of processing the data, i.e., the program.

BACKGROUND INFORMATION

The microcomputer system having the microcomputer and the storage arrangement constitutes, for example, one part of a control unit for a motor vehicle. A control unit of this type controls various functions in a motor vehicle, for example, the internal combustion engine, the transmission, the brake and power train, the driving-dynamics control system, etc. The control unit conventionally has a microcomputer that has an internal read-only memory and an internal rewriteable memory. A control program of the control unit is stored at least partially in the rewriteable memory. By re-programming the control program, it is theoretically possible in a controlled manner to change the controlled functions in the motor vehicle. For example, by manipulating the control program for the internal combustion engine, it is possible to increase the performance of the internal combustion engine in a relatively simple manner (so-called chip tuning). However, this often occurs at the cost of a long service life and of low exhaust emissions of the engine. For this reason, an unauthorized re-programming of the control program of a control unit renders liability and warranty claims null and void.

Familiar from the related art are various methods for protecting microcomputers against manipulation of the control program, and various protected microcomputers. In German Published Patent Application No. 197 23 332, the so-called seed & key method is described, which is widely used in the industry. In this known method, the validation program is stored in the internal read-only memory of the microcomputer. At every start-up of the microcomputer, a validation program is executed, in which, using a key, a code word is established from at least one part of the memory contents of the rewriteable memory and is compared with a comparison code word stored in the rewriteable memory. In the event that the code word agrees with the comparison code word, the microcomputer is enabled for executing further programs. Otherwise, the microcomputer is at least partially blocked.

If the control program of the microcomputer is manipulated, then, first, the rewriteable memory is erased and a manipulated control program is overwritten. In this context, the comparison code word originally stored in the rewriteable memory is lost. To generate a new code word, the key is required, which, however, is not readily available. Therefore, after a manipulation of the control program, the comparison code word and the code word usually do not agree, and the microcomputer is blocked.

However, the seed & key method known from the related art presupposes a microcomputer that has an internal read-only memory, in which the validation program is stored. The known method does not function in a microcomputer that does not have available to it an internal memory.

SUMMARY OF THE INVENTION

Therefore, it is an object of the present invention to prevent a manipulation of the memory contents, i.e. of data, or a program, stored in the storage arrangement, in a microcomputer that does not have available to it an internal memory, but rather accesses an external storage arrangement.

To achieve this object, based on the method for protecting a microcomputer system of the type cited above, it is proposed that, before the storage arrangement is accessed, an individual identifier is assigned to the or to each allocated microcomputer or to the storage arrangement, that a comparison code is generated as a function of the identifier and is stored in the storage arrangement, and that, before or during the operation of the microcomputer system, a security code is generated as a function of the identifier and is compared with the comparison code.

Before the storage arrangement is accessed, each microcomputer has assigned to it an individual identifier. Alternatively, or as a supplement, an individual identifier can also be assigned to the storage arrangement. This identifier can be set, for example, as a random number in the manufacturing process of the microcomputer or by the burning out of fuses at the customer site. If the program is programmed into the storage arrangement, then a comparison code, generated as a function of the identifier, is copied to the memory.

Before or during the operation of the microcomputer system, as a function of the identifier of the or each microcomputer, or of the storage arrangement, a security code is generated and is compared with the comparison code. The comparison of the security code with the comparison code can be executed by the storage arrangement and/or by the microcomputer.

If the comparison is executed by the storage arrangement, then the storage arrangement is blocked if the security code does not agree with the comparison code. In that case, it is impossible for the microcomputer to execute the program stored in the storage arrangement because the microcomputer cannot access the program.

If the comparison is executed by the microcomputer, then, in the event the security code does not agree with the comparison code, the microcomputer is blocked such that no execution of the program stored in the storage arrangement is possible.

In the context of a manipulation of data stored in the storage arrangement, the storage arrangement is first erased and is then overwritten by manipulated data. As a result of the erasure of the storage arrangement, the comparison code is also erased and is written once again into the storage arrangement. However, since the identifier of the or of each assigned microcomputer, or the identifier of the storage arrangement, is not freely accessible, it can be assumed that the security code will not agree with the comparison code after the manipulation of the data.

Contemporary housing technology for microcomputers and storage arrangements (e.g., ball-grid array (BGA) housings) makes it very difficult to listen to communications between the microcomputer and the storage arrangement after a reset, in order in this way to learn the identifier of the or of each microcomputer, or of the storage arrangement. Even if it should be possible in this manner for an unauthorized person to ascertain the identifier, it would only be possible, using this identifier, to manipulate the data of this one storage arrangement. Copying to another micro-computer system is not possible because the storage arrangement or the microcomputer of another microcomputer system has a different identifier.

Therefore, according to the present invention, there is an individual assignment of storage arrangement and microcomputer of a microcomputer system. This assignment results in the fact that a specific storage arrangement only cooperates reliably with one or a plurality of specific, assigned microcomputers. The readout of the memory, its modification, and its duplication for the purpose of manipulating the stored data are therefore pointless without knowledge of the individual identifier of the microcomputer or storage arrangement.

According to one advantageous refinement of the present invention, it is proposed that before the storage arrangement is accessed, the individual identifier is stored in the storage arrangement as the comparison code, and that, before or during the operation of the storage arrangement, a check is carried out as to whether the comparison code agrees with the identifier, used as a security code, of the or of each allocated microcomputer. This refinement represents a significant simplification of the method according to the present invention, without in the process impairing the protection of the storage arrangement from manipulation of the program.

If the comparison of the security code with the comparison code is carried out by the storage arrangement, the storage arrangement then advantageously only cooperates, normally, with the or with each microcomputer if the security code agrees with the comparison code.

Otherwise, the storage arrangement is blocked, and the microcomputer cannot access the program stored in the storage arrangement, or the program cannot be read out of the storage arrangement.

If the comparison of the security code with the comparison code is executed by the microcomputer, as an alternative or as a supplement, the microcomputer only cooperates with the storage arrangement in the event that the security code agrees with the comparison code. Otherwise, the microcomputer is blocked so that it is impossible to execute the program stored in the storage arrangement. In this specific embodiment of the present invention, no exchange of the storage arrangement is possible. This is particularly important because it would otherwise be possible for a person having the intention to manipulate to exchange a storage arrangement having the protective feature for a corresponding storage arrangement not having the protective feature. As a purely theoretical matter, in the case of this embodiment, to be able to execute a manipulation of data stored in the storage arrangement, both the microcomputer as well as the storage arrangement would have to be exchanged for corresponding components that did not have the protective features. However, this is associated with an enormous effort and therefore is very unlikely to play a role in practice.

According to one preferred embodiment of the present invention, it is proposed that the security code be generated before the operation of the storage arrangement after each start-up of the storage arrangement and that it be compared with the comparison code. The storage arrangement is preferably configured as a flash memory.

Advantageously, the storage arrangement is placed in a mode in which, after every start-up, it is switched from an inactive to an active state only when the security code agrees with the comparison code. After a reset of the storage arrangement, the latter can only be activated using a preestablished decoding sequence. The decoding sequence is only generated when the security code agrees with the comparison code. In the event the storage arrangement does not perceive this decoding sequence after a reset, the storage arrangement remains in an inactive state.

As an alternative or a supplement, it is proposed that the microcomputer be placed in a mode in which, after every start-up, it is switched from an inactive to an active state only when the security code agrees with the comparison code. After a reset of the microcomputer, the latter can be activated only using a preestablished decoding sequence. The decoding sequence is only generated when the security code agrees with the comparison code. In the event the microcomputer does not perceive this decoding sequence after a reset, it remains in an inactive state.

The method according to the present invention can be used in microcomputers that do not have internal memories. Of course, on the other hand, the method can also be used in microcomputers that have an internal memory. Microcomputers of this type can also be protected from a manipulation of the program by methods known from the related art. Therefore, according to another advantageous refinement of the present invention, it is proposed that a validation program stored in a read-only memory of the microcomputer be executed, a code word in the validation program being determined from at least one part of the memory contents of the storage arrangement using a key, and the code word being compared with a comparison code word stored in the storage arrangement. According to this refinement, the microcomputer is also protected from manipulation of the program by the so-called seed & key method. Both methods together provide a particularly effective protection against manipulation in microcomputers that have an internal memory.

In order to achieve the object of the present invention, it is furthermore proposed, on the basis of a storage arrangement of the type cited above, that in the storage arrangement a comparison code be stored that is generated as a function of an individual identifier assigned to the or to each microcomputer and/or to the storage arrangement, and that, before or during the operation of the microcomputer system, the storage arrangement have an element to generate a security code as a function of the individual identifier and to compare it with the comparison code.

According to one advantageous refinement of the present invention, it is proposed that the storage arrangement be placed in a mode in which, after every start-up, it is switched from an inactive to an active state only when the security code agrees with the comparison code.

The storage arrangement is advantageously configured as a flash memory, especially as a Flash Erasable Programmable Read-Only Memory (Flash-EPROM).

Finally, to achieve the object of the present invention, it is proposed, on the basis of a microcomputer system of the type cited above, that a comparison code that is generated as a function of an individual identifier assigned to the microcomputer or to the storage arrangement be stored in the storage arrangement, and that, before or during the operation of the microcomputer system, the microcomputer have an element to generate a security code as a function of the individual identifier and to compare it with the comparison code.

According to one advantageous refinement of the present invention, it is proposed that the microcomputer be placed in a mode in which, after every start-up, it is only switched from an inactive to an active state if the security code agrees with the comparison code.

DETAILED DESCRIPTION

Figure 1:
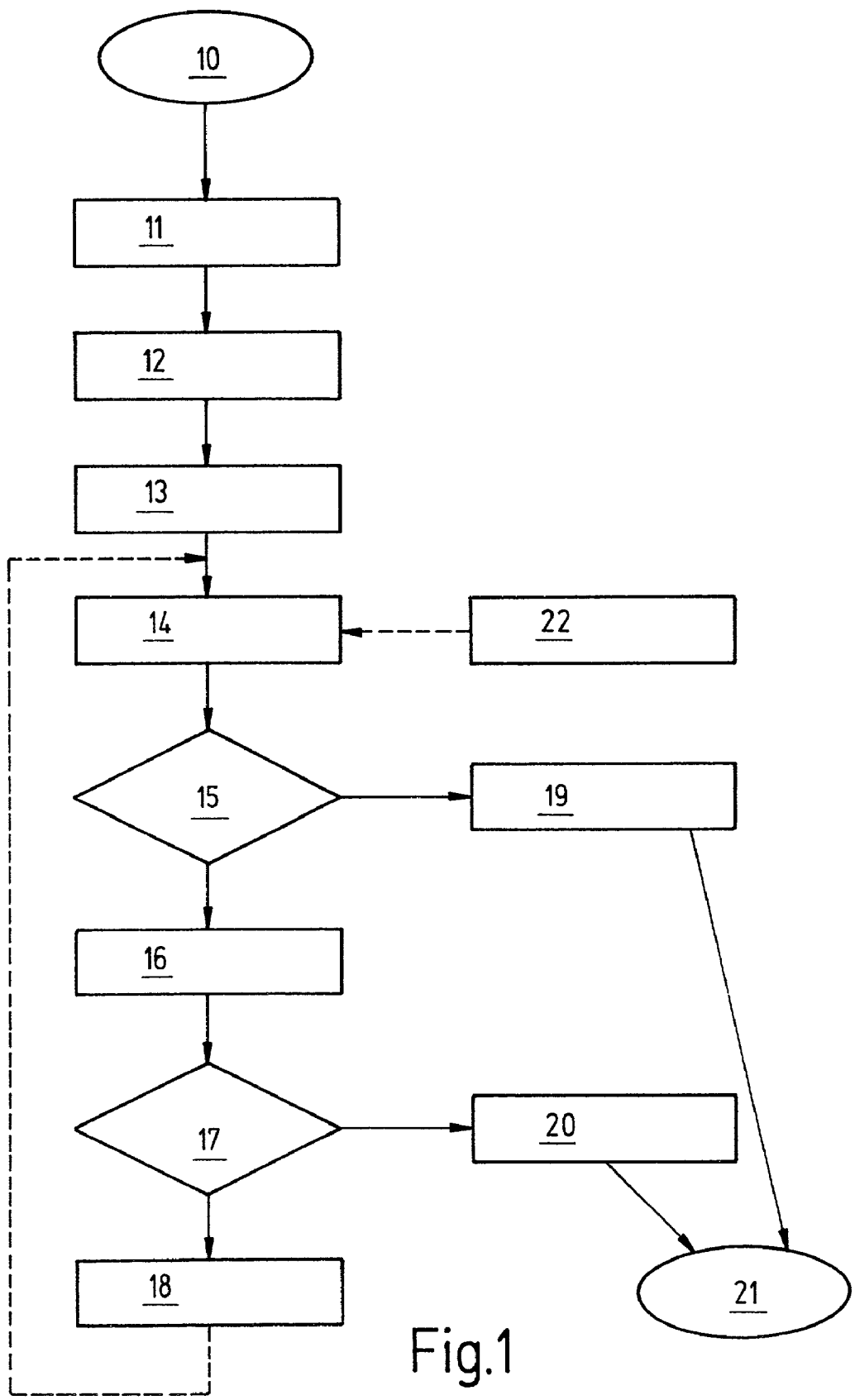
FIG. 1 shows a flow diagram of the method according to the present invention in accordance with a preferred specific embodiment.

In FIG. 1, a flow diagram is depicted of the method according to the present invention in accordance with one preferred embodiment. The method acts to protect a microcomputer system against manipulation of data stored in the storage arrangement, in particular for protecting against the manipulation of a stored program. The storage arrangement has assigned to it a microcomputer, which accesses the storage arrangement for processing the program. A method of this type can be used, for example, to protect a control unit of a motor vehicle from manipulation of the control program.

The method commences in a function block 10. Then, in a function block 11, an individual identifier is assigned to the microcomputer that is allocated to the storage arrangement. The identifier can be selected at random or in a controlled manner. In a subsequent function block 12, the comparison code is generated as a function of the identifier of the microcomputer, and it is then, in function block 13, stored in the storage arrangement. In the simplest case, the comparison code is made up of the identifier of the microcomputer. Steps 10 through 13 are executed before the storage arrangement is accessed, for example, in the context of the production process.

Subsequently, before or during the operation of the microcomputer system, for example, after every start-up of the microcomputer system, in function block 14, a security code is generated as a function of the identifier of the microcomputer. In the simplest case, the security code is made up of the identifier of the microcomputer. In a subsequent query block 15, the security code in the microcomputer is then compared with the comparison code. For this purpose, communication takes place between the microcomputer and the storage arrangement, in the course of which the comparison code stored in the storage arrangement is read out from the microcomputer. In the event the security code and the comparison code agree (yes), the microcomputer, in function block 16, is enabled.

In function block 16, communication also takes place between the microcomputer and the storage arrangement, in the course of which the security code is copied from the microcomputer to the storage arrangement. In a subsequent query block 17, the security code in the storage arrangement is then compared with the stored comparison code. In the event the security code and the comparison code agree (yes), then the storage arrangement, in function block 18, is enabled. The control unit can carry out its control and regulating tasks quite normally. If the storage arrangement is once again started up (dotted line), the method according to the present invention, in function block 14, commences once again. The storage arrangement is restored, for example, by a reset (function block 22), and is then started up.

It is decisive for the present invention that an individual assignment of storage arrangement and microcomputer of the microcomputer system take place. As was described above, this can come about through an identifier of the microcomputer or microcomputers of the microcomputer system. However, as an alternative or a supplement, the method according to the present invention can also operate using an individual identifier of the storage arrangement, as a result of which an individual assignment of the storage arrangement and microcomputer can similarly take place.

In the event the security code and the comparison code do not agree (no), the microcomputer, in function block 19, and/or the storage arrangement, in function block 20, is blocked. As a result, the read-out, or the execution, of the program stored in the storage arrangement is prevented. The control unit cannot fulfill its control and regulating function. In function block 21, the method according to the present invention is terminated.

The security code does not agree with the comparison code, for example, when the data stored in the storage arrangement have been manipulated, and the comparison code was stored in the storage arrangement erroneously or not all. Since the identifier of the microcomputer is only made available to authorized persons, a change in the data in the storage arrangement can only be carried out by these authorized persons. They know the identifier of the microcomputer assigned to the storage arrangement, and, after a change in the program, they can determine the correct comparison code and store it in the storage arrangement.

Figure 2:
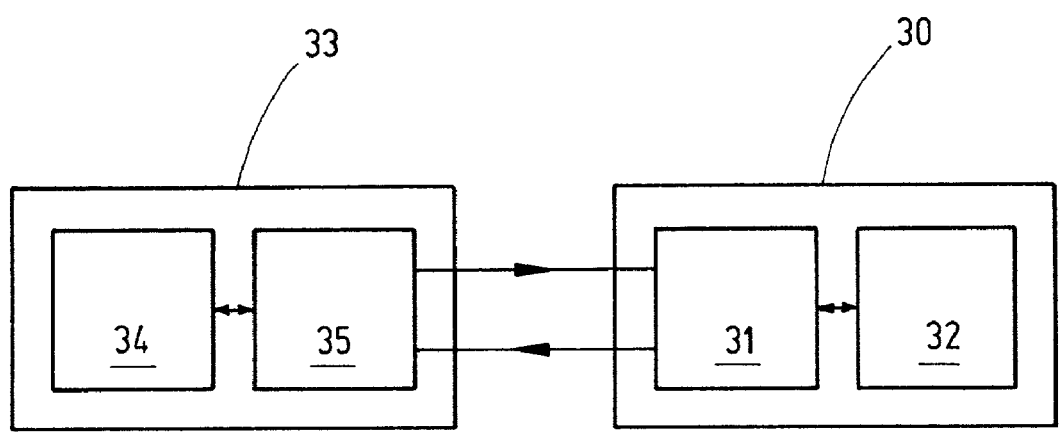
FIG. 2 shows a micro-computer system according to the present invention in accordance with a preferred specific embodiment.

In FIG. 2, a microcomputer system according to the present invention in accordance with one preferred specific embodiment is designated as reference numeral 30 (storage arrangement) and 33 (microcomputer). Storage arrangement 30 has a rewriteable memory 31, in which at least one part of a program is stored. Microcomputer 33, in its microcomputer core 35, accesses memory 31 for processing the program. Microcomputer 33 and storage arrangement 30, for example, are a part of a control unit for a motor vehicle.

In memory 31 of storage arrangement 30, a comparison code is stored that has been generated as a function of an individual identifier assigned to microcomputer 33. In the simplest case, the comparison code can be the identifier itself. Before or during the operation of microcomputer system 30, 33, for example, after the start-up of microcomputer system 30, 33, the identifier of microcomputer 33 is copied to storage arrangement 30. Storage arrangement 30 has an element 32, to generate the security code before or during the operation of storage arrangement 30 as a function of the identifier of microcomputer 33. In the simplest case, the security code can be the identifier itself.

An element 32, 34 compares the security code with the stored comparison code. Storage arrangement 30 is placed in a mode in which, after each start-up, it can be switched from an inactive to an active state only if the security code agrees with the comparison code (function block 18). After the reset of storage arrangement 30, the latter can be activated only using a preselected decoding sequence. The decoding sequence is only generated if the security code agrees with the comparison code. In the event storage arrangement 30 does not perceive this decoding sequence after a reset, then it remains in an inactive state (function block 20).

By analogy thereto, microcomputer 33 has an element 34 to generate and to check a security code. Microcomputer 33 is placed in a mode in which, after each start-up, it is switched from an active to an active state only if the security code agrees with the comparison code (function block 16). After the reset of microcomputer 33, the latter can be activated only using a preselected decoding sequence. The decoding sequence is only generated if the security code agrees with the comparison code. In the event microcomputer 33 does not perceive this decoding sequence after a reset, it remains in an inactive state (function block 19).

An element 34 of microcomputer 33 therefore checks the correct identification of storage arrangement 30, and an element 32 of storage arrangement 30 checks the correct identification of microcomputer 33.

What is claimed is:

1. A method for protecting a microcomputer system from manipulation of data stored in a storage arrangement of the microcomputer system, the microcomputer system including a microcomputer allocated to the storage arrangement, comprising the steps of:
    causing the microcomputer to access the storage arrangement for processing the data; and
    before the storage arrangement is accessed, performing the steps of:
        assigning an individual identifier to one of the allocated microcomputer and the storage arrangement,
        generating a comparison code and storing the comparison code in the storage arrangement as a function of the individual identifier, and
        at a time that is one of before and during an operation of the microcomputer system, generating a security code as a function of the individual identifier and comparing the security code with the comparison code, wherein the allocated microcomputer accesses the storage arrangement only if the security code agrees with the comparison code, and wherein the allocated microcomputer is assigned only to the storage arrangement and the storage arrangement is assigned only to the allocated microcomputer so that the assigned, allocated microcomputer and the assigned storage arrangement can operate only with each other.

2. The method according to claim 1, wherein:
the data corresponds to a program.

3. The method according to claim 1, wherein:
a program stored in the storage arrangement is protected.

4. The method according to claim 1, wherein before the storage arrangement is accessed, the method further comprises the steps of:
    storing the individual identifier as the comparison code in the storage arrangement; and
    at the time that is one of before and during the operation of the microcomputer system, performing a check as to whether the comparison code agrees with the individual identifier, used as the security code, of the allocated microcomputer.

5. The method according to claim 1, wherein:
the storage arrangement normally cooperates with the allocated microcomputer only when the security code agrees with the comparison code.

6. The method according to claim 1, wherein:
before an operation of the storage arrangement, after every start-up of the storage arrangement, the security code is generated and is compared with the comparison code.

7. The method according to claim 6, further comprising the step of:
placing the storage arrangement in a mode in which, after every start-up, the storage arrangement is switched from an inactive state to an active state only when the security code agrees with the comparison code.

8. The method according to claim 6, further comprising the step of:
placing the allocated microcomputer in a mode in which, after every start-up, the allocated microcomputer is switched from an inactive to an active state only when the security code agrees with the comparison code.

9. The method according to claim 1, further comprising the steps of:
    executing a validation program stored in a read-only memory of the allocated microcomputer;
    determining a code word in the validation program from at least one part of a memory content of the storage arrangement in accordance with a key; and
    comparing the code word with a comparison code word stored in the storage arrangement.

10. A storage arrangement in which data are stored and to which is allocated at least one microcomputer that accesses the storage arrangement for processing the data, comprising:
    an arrangement for storing a comparison code that is generated as a function of an individual identifier assigned to one of the at least one microcomputer and the storage arrangement; and
    an arrangement for, at a time that is one of before and during an operation of the storage arrangement, generating a security code as a function of the individual identifier and for comparing the security code with the comparison code, wherein the microcomputer accesses the storage arrangement only if the security code agrees with the comparison code, and wherein the microcomputer is assigned only to the storage arrangement and the storage arrangement is assigned only to the microcomputer so that the assigned microcomputer and the assigned storage arrangement can operate only with each other.

11. The storage arrangement according to claim 10, wherein:
the data correspond to a program.

12. The storage arrangement according to claim 10, wherein:
the storage arrangement is capable of being placed in a mode in which, after every start-up, the storage arrangement is switched from an inactive state to an active state only when the security code agrees with the comparison code.

13. The storage arrangement according to claim 10, wherein:
the storage arrangement corresponds to a flash memory.

14. A microcomputer system, comprising:
    a microcomputer; and
    a storage arrangement assigned to the microcomputer, wherein:
        data are stored in the storage arrangement,
        the microcomputer accesses the storage arrangement in order to process the data,
        in the storage arrangement, a comparison code that is generated as a function of an individual identifier assigned to one of the microcomputer and to the storage arrangement is stored, and the microcomputer includes an arrangement for, at a time that is one of before and during an operation of the microcomputer system, for generating a security code as a function of the individual identifier and to compare the security code with the comparison code, wherein the microcomputer accesses the storage arrangement only if the security code agrees with the comparison code, and wherein the microcomputer is assigned only to the storage arrangement and the storage arrangement is assigned only to the microcomputer so that the assigned microcomputer and the assigned storage arrangement can operate only with each other.

15. The microcomputer according to claim 14, wherein:

the data correspond to a program.

16. The microcomputer according to claim 14, wherein:

the microcomputer is capable of being placed in a mode in which, after every start-up, the microcomputer is switched from an inactive state to an active state only when the security code agrees with the comparison code.

* * * * *